United States Patent
Delén et al.

(10) Patent No.: US 7,926,244 B2
(45) Date of Patent: Apr. 19, 2011

(54) METHOD OF PRODUCING A PACKAGE

(75) Inventors: Anders Delén, Kävlinge (SE); Thorbjörn Bengtsson, Södra Sandby (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 47 days.

(21) Appl. No.: 12/282,257

(22) PCT Filed: Feb. 13, 2007

(86) PCT No.: PCT/SE2007/000123
§ 371 (c)(1),
(2), (4) Date: Sep. 9, 2008

(87) PCT Pub. No.: WO2007/106006
PCT Pub. Date: Sep. 20, 2007

(65) Prior Publication Data
US 2009/0098990 A1    Apr. 16, 2009

(30) Foreign Application Priority Data
Mar. 10, 2006 (SE) ...................................... 0600545

(51) Int. Cl.
*B67B 3/20* (2006.01)
(52) U.S. Cl. .............. 53/490; 53/317; 53/331.5; 156/69; 493/114
(58) Field of Classification Search ............... 53/490, 53/300, 317, 331.5; 156/69, 514; 493/213, 493/927, 114
See application file for complete search history.

(56) References Cited

U.S. PATENT DOCUMENTS

| | | | | |
|---|---|---|---|---|
| 3,778,321 A | * | 12/1973 | Abbott | 156/446 |
| 4,123,312 A | * | 10/1978 | Schmid et al. | 156/466 |
| 4,152,566 A | * | 5/1979 | Magerle | 219/655 |
| 4,222,214 A | * | 9/1980 | Schultz et al. | 53/309 |
| 4,512,136 A | * | 4/1985 | Christine | 53/410 |
| 4,547,645 A | * | 10/1985 | Smith et al. | 219/604 |
| 4,608,805 A | | 9/1986 | Kelly | |
| 4,696,144 A | | 9/1987 | Bankuty et al. | |

(Continued)

FOREIGN PATENT DOCUMENTS
EP    1 249 426 A1    10/2002

(Continued)

OTHER PUBLICATIONS

International Search Report (PCT/ISA/210).

*Primary Examiner* — Thanh K Truong
(74) *Attorney, Agent, or Firm* — Buchanan Ingersoll & Rooney PC

(57) ABSTRACT

The invention relates to a method, in a filling machine, of producing a package with a top of plastic which is injection molded in the machine and is capped before the top has become configurationally stable. In the method, the capping, at least during a first introductory phase, takes place in that a cap with internal threads is rotated and the package is displaced linearly in a direction towards the cap in such a manner that it may be ensured that the relationship between the speed of rotation of the cap and the speed of displacement of the package substantially correspond to the thread pitch of the threads in the cap and in corresponding threads on the neck when the threads enter into mesh with one another.

17 Claims, 7 Drawing Sheets

U.S. PATENT DOCUMENTS

| | | | |
|---|---|---|---|
| 4,716,708 A | | 1/1988 | Ochs |
| 5,211,798 A | * | 5/1993 | Keller .......................... 156/500 |
| 5,492,592 A | * | 2/1996 | Bergholtz et al. ............. 156/556 |
| 5,498,149 A | * | 3/1996 | Bengtsson ................. 425/387.1 |
| 5,621,960 A | * | 4/1997 | Kaminski ....................... 29/456 |
| 5,690,764 A | * | 11/1997 | Dirksing et al. ................ 156/69 |
| 5,704,541 A | * | 1/1998 | Mogard ................... 229/125.15 |
| 5,943,840 A | * | 8/1999 | Nilsson et al. ................ 53/133.2 |
| 5,962,096 A | * | 10/1999 | Smith et al. .................. 428/35.7 |
| 5,964,687 A | * | 10/1999 | Rogalski et al. ............. 493/102 |
| 6,066,081 A | * | 5/2000 | Bachner ....................... 493/102 |
| 6,399,014 B1 | * | 6/2002 | Hermodsson .................. 264/515 |
| 6,478,175 B1 | * | 11/2002 | Tuckner et al. ................ 215/329 |
| 6,510,675 B1 | * | 1/2003 | Strassler ......................... 53/490 |
| 6,536,187 B2 | * | 3/2003 | Lees et al. ...................... 53/410 |
| 6,581,357 B1 | * | 6/2003 | Lindenberger .................. 53/412 |
| 7,010,902 B2 | * | 3/2006 | Pagh ............................... 53/485 |
| 7,090,630 B2 | * | 8/2006 | Boldrini et al. ................. 493/51 |
| 2005/0150193 A1 | | 7/2005 | Bernhard |

FOREIGN PATENT DOCUMENTS

WO     WO 02/070365 A1     9/2002

* cited by examiner

METHOD OF PRODUCING A PACKAGE

TECHNICAL FIELD

The present invention relates to a method of producing a package in a filling machine, the package being provided with an opening device.

BACKGROUND ART

Within the food industry, it is common practice to pack drinks and other products with high viscosity in packages manufactured from packaging laminates comprising a core layer of paper or paperboard and one or more barrier layers of, for example, plastic.

One common package type is manufactured in a filling machine in that flat-laid, tube-shaped blanks of the above-described packaging laminate are raised and sealed in their one end in that a top of plastic is injection moulded direct on the end portion. The package is then transported with its open end directed upwards and is filled in a subsequent filling station. In certain cases, the package also passes one or more sterilisation stations before the filling operation. After filling, the open end of the package is folded and sealed. The Applicant markets these types of package under the trademark Tetra Top®.

These packages with an injection moulded top are normally provided with an opening arrangement or device with a neck, defining a pouring spout, the neck being provided with a tear-off membrane. The membrane ensures that the opening arrangement, before being opened, is completely tight and indicates that the package has not previously been opened (tamper-proof). This is described in greater detail in the Applicant's own Patent Publication WO 02/070365. The membrane is injection moulded in the same operation as the top and is an integrated part of the neck. In order for the membrane to be able to be removed, it is provided with a pull lug and, in the line between the pouring opening of the neck and the membrane, there is a weakened line in order to facilitate the tear-off operation. When the package is sold, the membrane is normally covered by, for example, a screw cap. The function of the screw cap is to permit a certain reclosure once the membrane has been pulled off. The membrane has inner threads which cooperate with outer threads on the neck and the packages are provided with screw caps after final folding and discharge in a separate unit located outside the filling machine. In this position, the tops are cooled and are to be considered as configurationally stable.

However, it has proved in certain studies that a number of consumers prefer opening a package in one step, instead of the two steps, which will be the case with the combination of a screw cap and membrane, but wish to retain the reclosure facility which is offered by a screw cap. For such a solution to be able to be realised without the filling machine needing to be completely redesigned and retooled, it is necessary that the capping takes place in close association with the injection moulding and before filling. However, this has proved to be fraught with problems.

In injection moulding, a plastic material, in this case HDPE, is heated up to a temperature which is higher than its melting point. The melting point for HDPE lies in the range of between 115 and 145° C. The material is then permitted to cool at its own rate or by active cooling, whereby the material crystallises. No polymer can crystallise to 100%, but polyethylene can generally crystallise up to 90%. The entire crystallisation process, including after shrinkage, normally takes up to twenty-four hours. The material has then become stable and rigid. However, it is usual to designate a polymer material as configurationally stable already when it has cooled to room temperature. Above room temperature, the risk is greater that the material will be damaged and lose its form and shape if it is exposed to compression-and tensile stresses. Naturally, the material is at its most sensitive immediately after the injection moulding.

This sensitivity in the material becomes problematical if the intention is to injection mould a package top and then cap the top just after the injection moulding. When the package is removed from the mandrel wheel where the injection moulding takes place, the temperature of the top is approximately 75-90° C., preferably 85-90° C.

BRIEF SUMMARY OF THE INVENTION

One object of the present invention is therefore to realise a method of producing, in a filling machine, a package with a pouring opening injection moulded in the machine, to close said pouring opening with a cap so that the requisite tightness is achieved in the package prior to opening, and sterilising and filling the package after the capping. It is also one object of the present invention to realise a method of producing a package with a short lead time in the machine and without any intermediate storage of packages or caps outside the machine.

These objects have been attained by means of a method comprising the steps of: producing a sleeve of a packaging laminate comprising at least a core layer of paper, injection moulding a top of plastic material on the end portion of said sleeve so that there is formed a liquid-tight connection between said sleeve and said top, in the injection moulding, providing the top with a part of said opening arrangement which includes a neck with external threads, the neck defining a pouring opening, capping the neck before the top has reached the configurationally stable state, the capping, at least during a first introductory phase, taking place in that a cap with corresponding internal threads is rotated and the package is displaced in a direction towards the cap in such a manner that it may be ensured that the relationship between the speed of rotation of the cap and the speed of displacement of the package substantially correspond to the thread pitch of the threads in the cap and on the neck when the threads mesh with one another.

This method makes for the production of a tight package with a one step opening, where the top of the package is injection moulded in a machine in order to be capped briefly thereafter. By such means, the design and construction of the units of the original machine may be retained in substantially unchanged state. A machine will be realised which is efficient and can deliver a complete package with a screw cap.

In that the speed of rotation of the cap and the speed of displacement of the package are matched to the thread pitch of the threads on the neck and in the cap, the risk will be eliminated that the threads on the neck are deformed by compression stresses from the threads in the cap, this regardless of how the thread lead entrances lie in relation to one another when the cap meets the neck. As a result, the tightness between the cap and the neck can be better controlled.

BRIEF DESCRIPTION OF THE ACCOMPANYING DRAWINGS

The present invention will now be described in greater detail hereinbelow, with reference to one currently preferred embodiment which is shown on the accompanying Drawings and in which:

FIG. 1 schematically shows a package comprising a sleeve which, in one end, is open and, in the other end, is closed by means of a top;

FIG. 2 schematically shows units in the filling machine (seen from the side) which are above all relevant to the invention;

Figure 5:
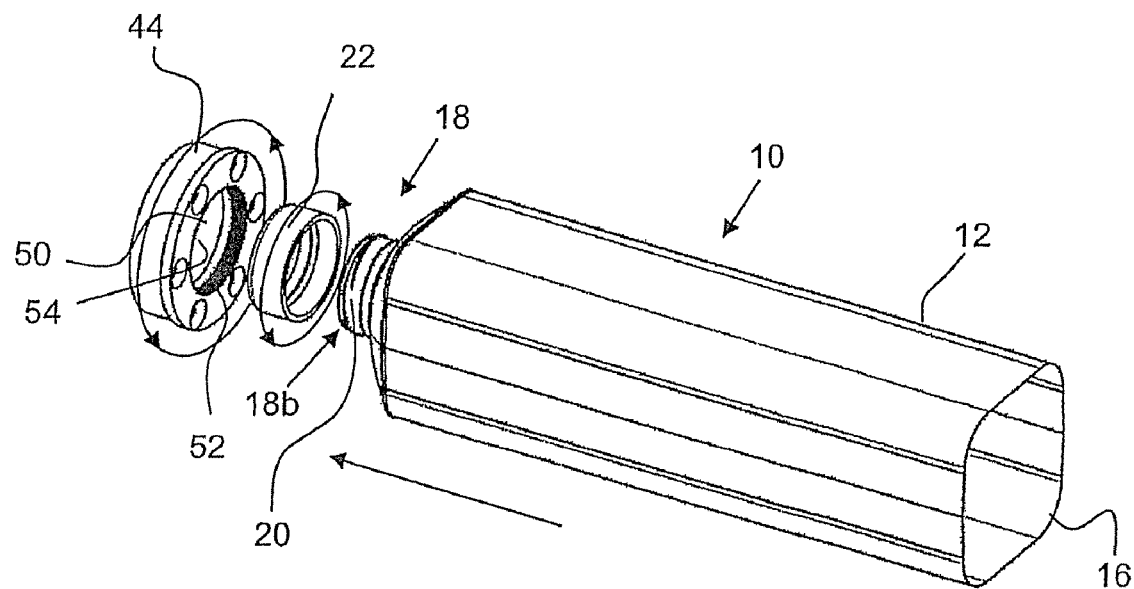
Figure 6:
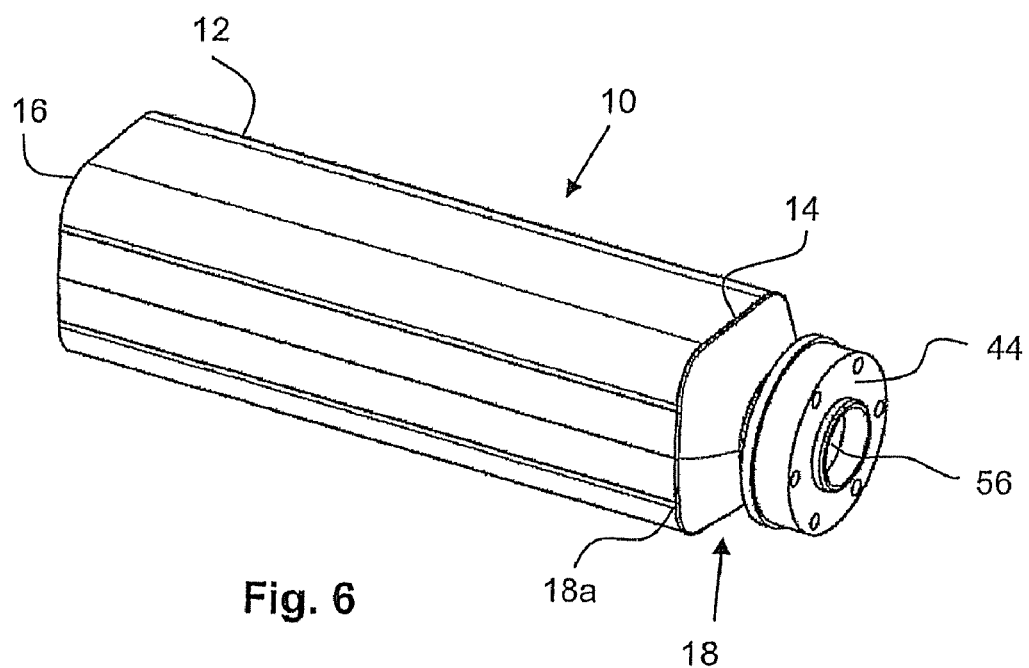
Figure 7:
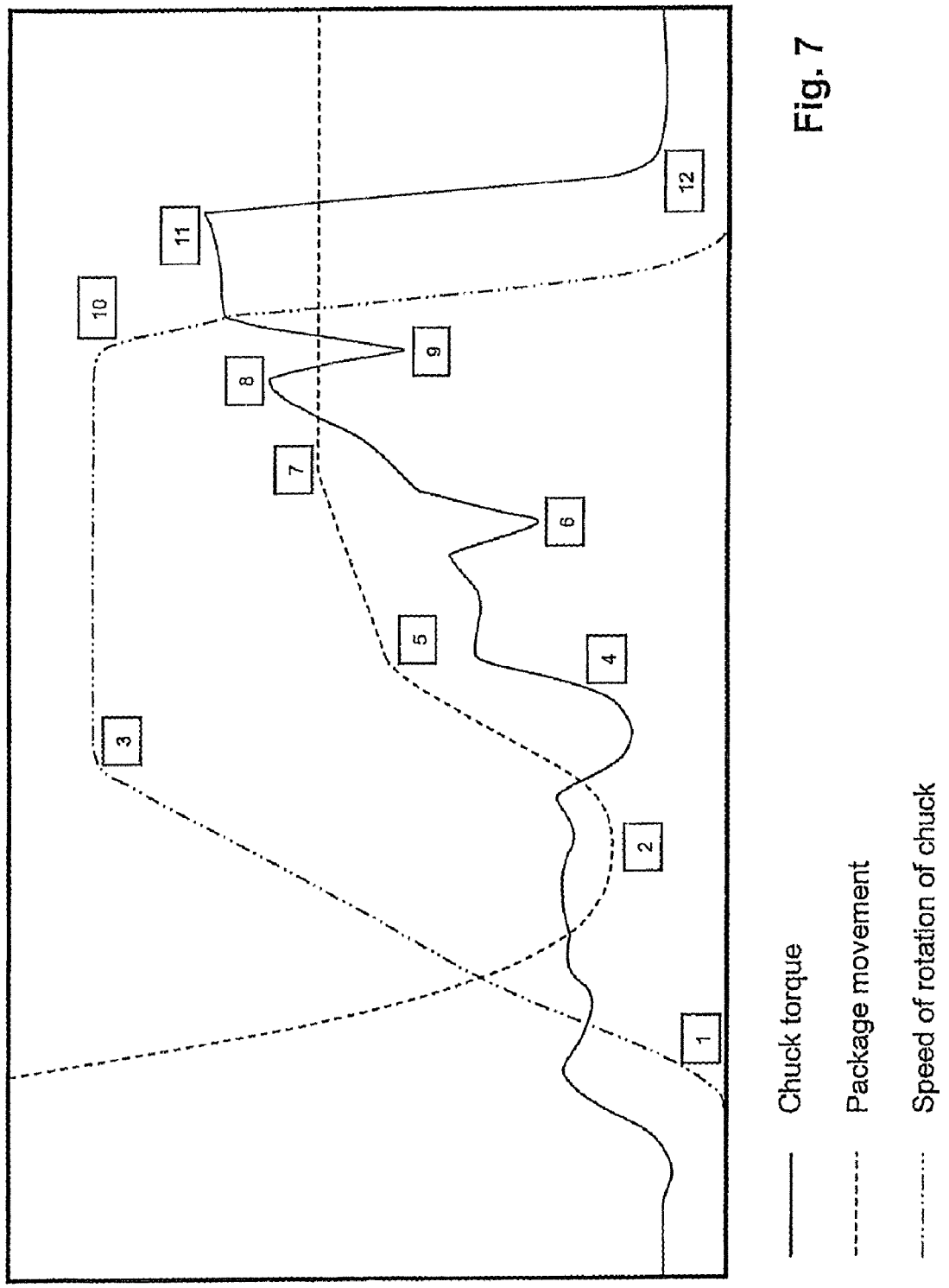
Figure 8:
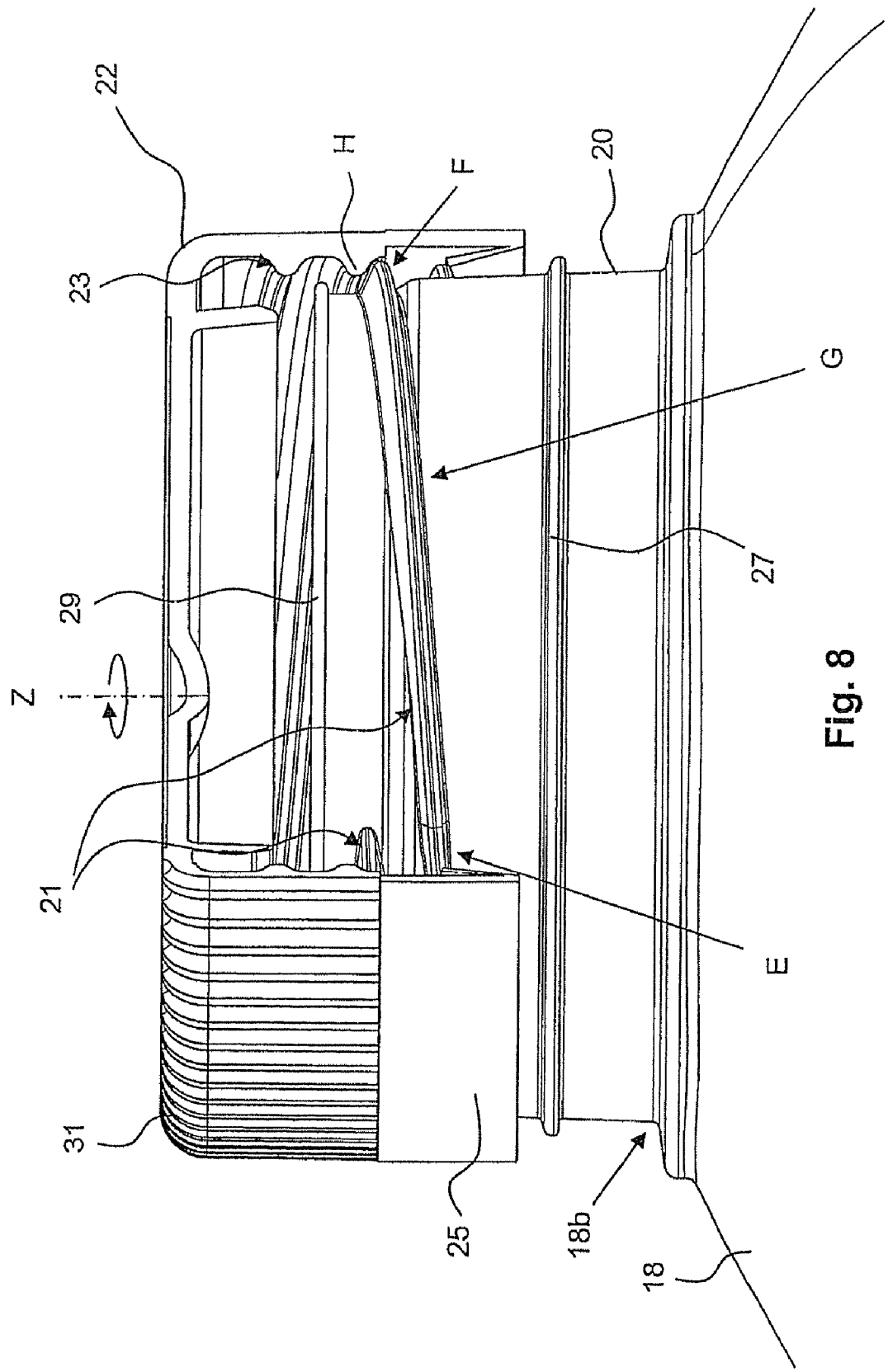
Figure 9:
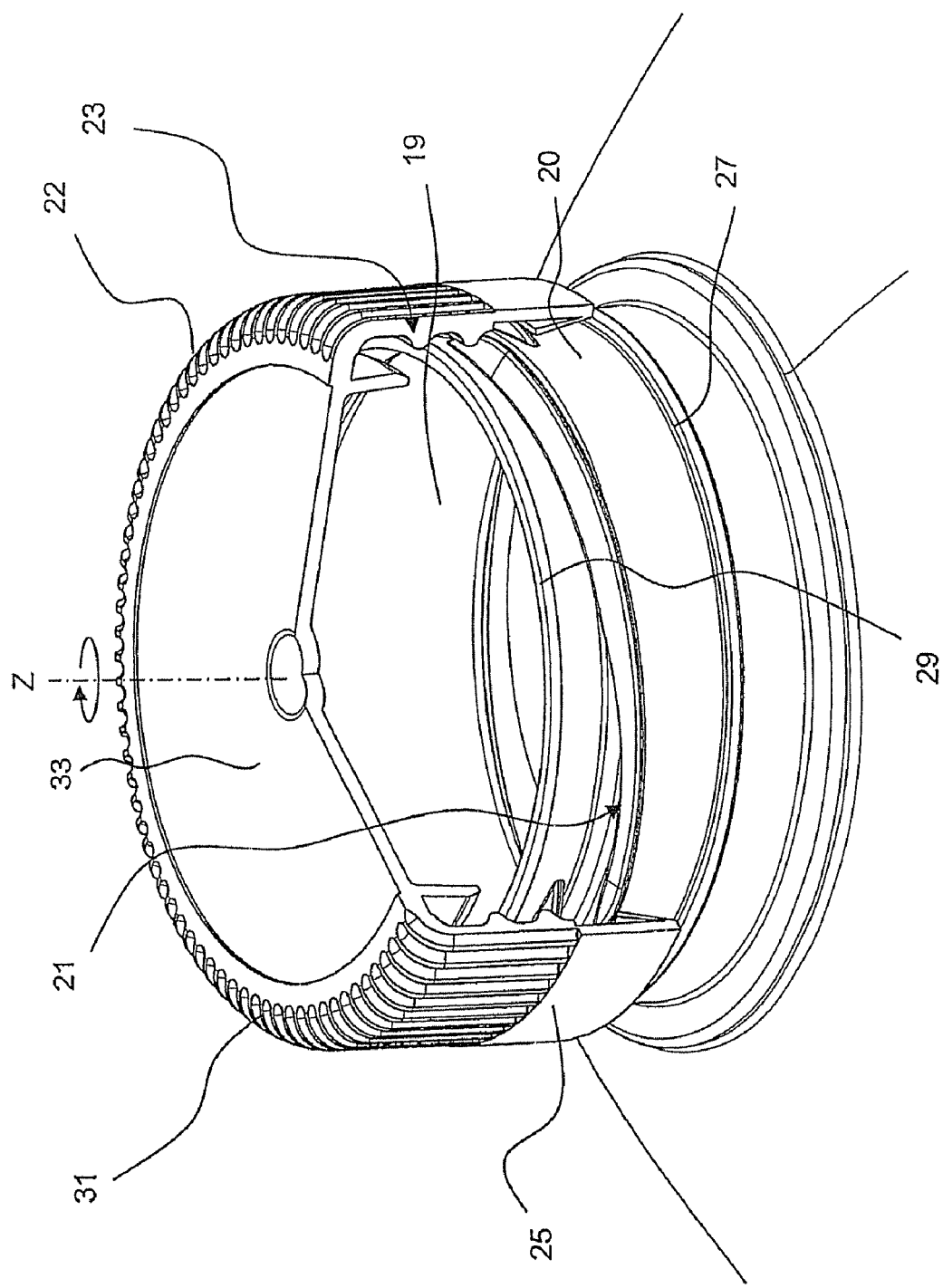

FIG. 5 schematically shows an exploded view in perspective of the chuck, the cap and the package;

FIG. 6 is a schematic view in perspective of the package, the cap and the chuck during the capping phase;

FIG. 7 is a schematic diagram of the capping phase;

FIG. 8 is a schematic plan view of a top with a neck on which a partially sectioned cap is shown; and FIG. 9 schematically shows the top and the cap of FIG. 8, albeit in perspective view.

DETAILED DESCRIPTION OF ONE EMBODIMENT

Figure 1:
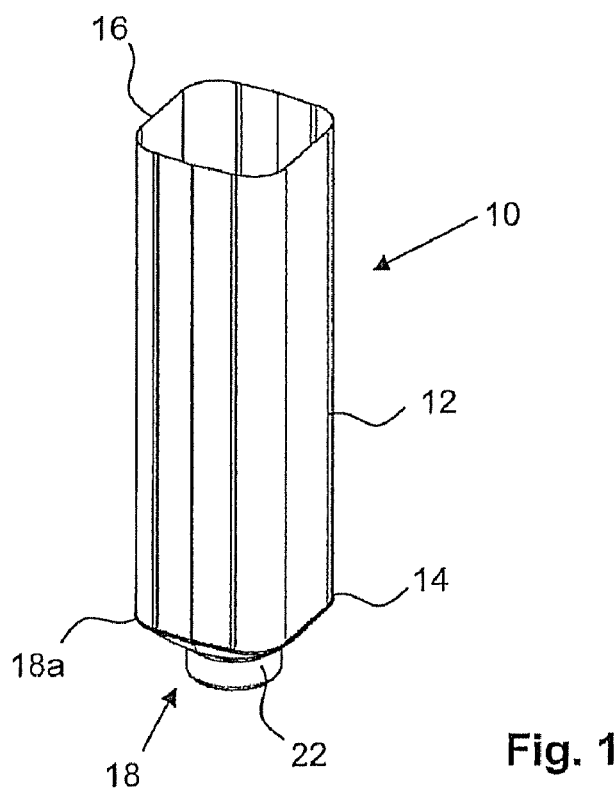

FIG. 1 shows one example of a package which may be manufactured using the method according to the present invention. In this case, the package, which hereafter is designated 10, consists of a blank 12 of packaging laminate which has been reformed into a sleeve and sealed into tube form. A first end 14 of the package has been closed in that a package top 18 with an opening arrangement or device has been injection moulded onto the sleeve end 14. The other end 16 is shown in the figure as being open, but is, in a conventional manner, to be transversely sealed and refolded into a substantially square or rectangular bottom. The top 18 includes a lower portion 18a which is connected in liquid-tight fashion to the sleeve, and an upper portion in the form of an opening arrangement 18b. The lower portion is best seen in FIG. 6.

The opening arrangement 18 comprises a pouring spout or opening 19 which is surrounded or defined by a neck 20. Both are shown in FIGS. 8 and 9. In the same figures, it is shown that the neck 20 is provided with external threads 21 for cooperation with corresponding internal threads 23 in a screw cap 22. The screw cap 22 includes a tamper evidence band 25 which in a conventional manner serves the purpose of displaying whether the package has been opened or not. On capping, the band 25 is forced over an edge 27 on the neck against which an inner edge of the band 25 will later act and be prevented from being forced back on opening of the package 10. The neck 20 of the top 8 is also provided with a sealing edge 29 which is disposed to abut against the inside of the screw cap.

The top 18 is preferably of HDPE, i.e. high density polyethylene, and the screw cap 22, which hereafter will be referred to as a cap, is preferably also manufactured from HDPE. Naturally, the present invention is not restricted to these materials, but other polymer materials are of course conceivable.

In the description, the overriding designation "package" 10 will be employed throughout. Naturally, it should be understood that this designation also encompasses packaging blanks in all of the different phases or states which they undergo in the filling machine on their way to becoming finished packages. The term finished package is here taken to signify a product-filled, sealed and finally formed package.

Similarly, the filling machine includes two parallel lines, i.e. two packages are produced simultaneously. For the sake of simplicity, only handling in one of these lines will be described, even though a couple of figures will show the parallel lines.

Figure 2:
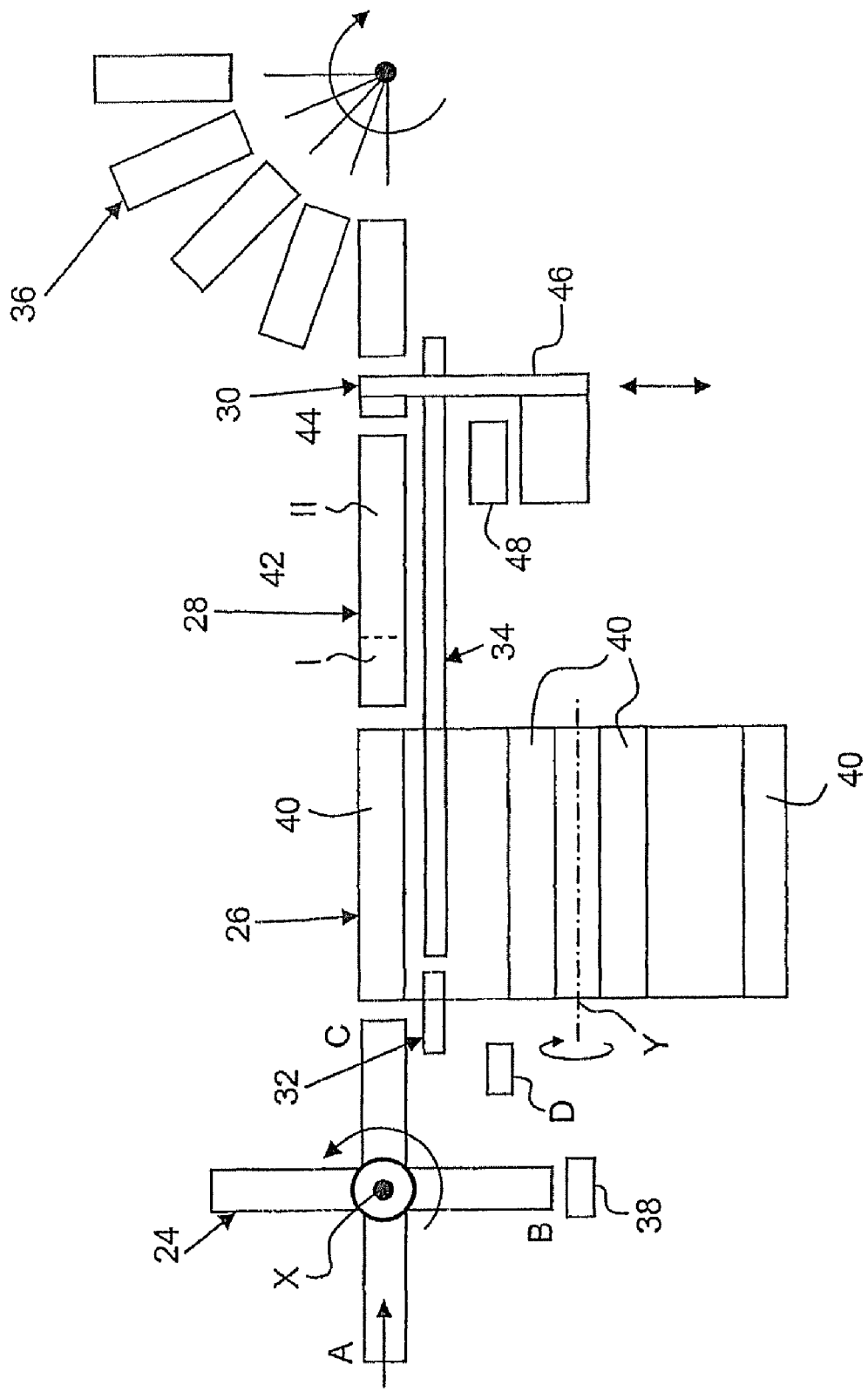

In a filling machine for the production of packages of the type mentioned by way of introduction, there is a number of units of which some are depicted in principle in FIG. 2. From left to right in the figure, there are shown a mandrel wheel 24, a magazine 26, a package guide 28 and a cap applicator 30. In the figure, a first conveyor 32 is also shown which is disposed to displace packages between the mandrel wheel 24 and the magazine 26, a second conveyor 34 which is disposed to displace packages 10 between the magazine 26 and the package guide 28, as well as, within the package guide 28 and via the cap applicator 30 to a third conveyor 36. The third conveyor 36 is disposed to take care of the ready-capped packages 10.

The mandrel wheel unit 24 is previously known in the art. In this unit, the stage of injection moulding a top 18 on a package sleeve 12 takes place. The unit comprises a mandrel wheel 24 rotatable about an axis X and provided with four arms (so-called mandrels) which cooperate with, in this particular case, three stations of which one is an injection moulding apparatus 38 where the injection moulding proper of the top 18 is realised. In the first station, designated A, a package sleeve 12 (not shown) is passed on and positioned on one of the four right-angle arms in the mandrel wheel 24. This is illustrated by means of an arrow. The wheel 24 is then rotated to the next station, designated B, where the top 18 is injection moulded on the sleeve 12. On the injection moulding, an inner tool, which is disposed on the mandrel wheel arm, cooperates with an outer pair of tools. The sleeve edge is clamped between the inner and outer tools during the injection moulding. The technique of injection moulding a plastic top 18 on a sleeve 12 is previously known and will not be described in greater detail here. However, the tops which have hitherto been injection moulded in similar filling machines have included a membrane which has covered the pouring opening 19. However, in the method according to the present invention, a top 18 is injection moulded with an open pouring opening 19. This difference in the top design has occasioned an alteration of the moulding tools. Previously, the inlet gate to the moulding tools was disposed at the membrane and the pull tab. In the present invention, a number of inlet gates are instead disposed towards the neck 20 of the top 18. Those strands of sprue which are formed are cut off. While the package 10 is rotated from the injection moulding to the third station C where the package 10 is to leave the mandrel wheel 24, it moves past a stationary knife D which cuts away the excess plastic.

In this context, it should be mentioned that there is one mandrel wheel 24 per filling line, i.e. in this case two in a number.

Figure 3:
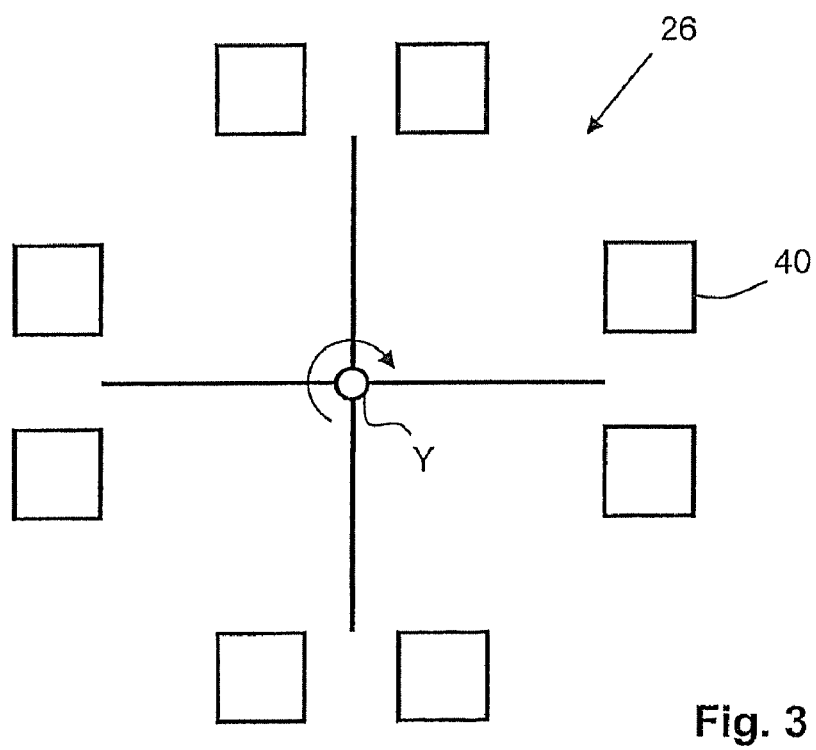
FIG. 3 is a schematic view of the channels of the magazine for packages.

After the injection moulding, the package 10 is rotated to said third station C where the sleeve with the newly injected top 18 is displaced from the mandrel wheel arm to the next unit, the magazine unit 26. There, a minor cooling takes place of the top 18 while the package 10 is given the opportunity to rotate one revolution in the magazine 26. Unlike the mandrel wheel 24 which is rotary about the axis X, the magazine 26 is rotary about an axis Y which is substantially at right angles to the axis X. In such instance, the magazine 26 will be described with the guidance of FIG. 2 and FIG. 3 which show the magazine 26 highly schematically in a view at right angles to the view of FIG. 2. The axis Y thereby runs into the plane of the paper in FIG. 3. In these figures, it may be seen that the magazine 26 is formed as a revolver wheel comprising four pair of channels 40 for receiving packages. Both of the lines share the space in the magazine 26, in which event one channel 40 in each pair is employed by each respective line. Thus, a total of eight packages 10 can be rotated simultaneously. Naturally, the magazine 26 may be designed so that more or fewer packages 10 can be rotated simultaneously.

The channels are substantially parallel with the longitudinal direction of the filling machine and, in each rotation step, one of the pairs will arrive in a position which lies in line with the third station C of the mandrel wheel, i.e. that station where a transfer of a package 10 from the mandrel wheel 24 to the magazine 26 takes place. This position preferably has its counterpart in the position of the channels 40 which are located uppermost in the magazine 26, see FIG. 2.

The channels 40 are formed by means of sliding rails which are capable of carrying and supporting the packages about their cross section. The inner cross section of each channel 40 is preferably only slightly larger than the cross section of a package and has a configuration which corresponds with the outer periphery of the top at the sleeve edge. The channels are then capable of ensuring that the configuration of the top is maintained and reduce the risk of any possible deformation. The packages are further supported recumbent in the channels 40. The length of the channels corresponds approximately to the height of one package 10.

As was mentioned previously, the magazine 26 is a cooling station. The temperature lies approximately in the range of between 75 and 90° C., preferably 80-85° C., when the packages 10 are displaced into the magazine, and when they are displaced out of the magazine 26, the temperature lies in the range of between 65 and 80° C., preferably approximately 70° C. As a result, no proper cooling down to room temperature has had time to take place, and the package tops 18 have, as a result, not had time to become configurationally stable. If a better cooling of the tops 18 is intended, the magazine 26 may be provided with means for active cooling using air. Nozzles (not shown) connected to a source for cooled air or compressed air may then be employed, and the cooled air is blown towards the tops 18 throughout the whole or part of the time when the packages are located in the magazine 26. Even if active cooling gives a more effective cooling of the tops 18, it is nevertheless, at least taking into account reasons of cost and space, not possible to approach down to room temperature where reliable configurational stability is achieved. However, it is possible to get down to a temperature in the range of between 40 and 50° C.

The packages 10 are rotated one revolution in the magazine 26 and thereby displaced out at the same position where they came in, but in a downstream direction in the machine. The next unit is, as was mentioned previously, the package guide 28.

The package guide 28 cooperates with the cap applicator 30 and the conveyor 34 and together they realise the step of capping the package 10 with a cap 22.

The package guide 28 is very reminiscent of the channels in the magazine and is manufactured from sliding rails 42. The inner cross section is preferably only slightly larger than the cross section of the package 10, and has a configuration which corresponds with the outer periphery of the top at the sleeve edge. The channels may then ensure that the package does not rotate during the capping phase and the top 18 retains its form when the torque is applied. Also here, the package 10 is recumbent. The guide 28 is disposed flush with the upper position of the magazine 26 and has an extent in the longitudinal direction of the machine which corresponds to slightly more than the height of a package 10. Further, the guide 28 is disposed with a first and second package position I and II. A first position I which faces towards the magazine 26 and a second position II which faces towards the cap applicator 30. This division is illustrated symbolically by a broken line in FIG. 2.

Figure 4:
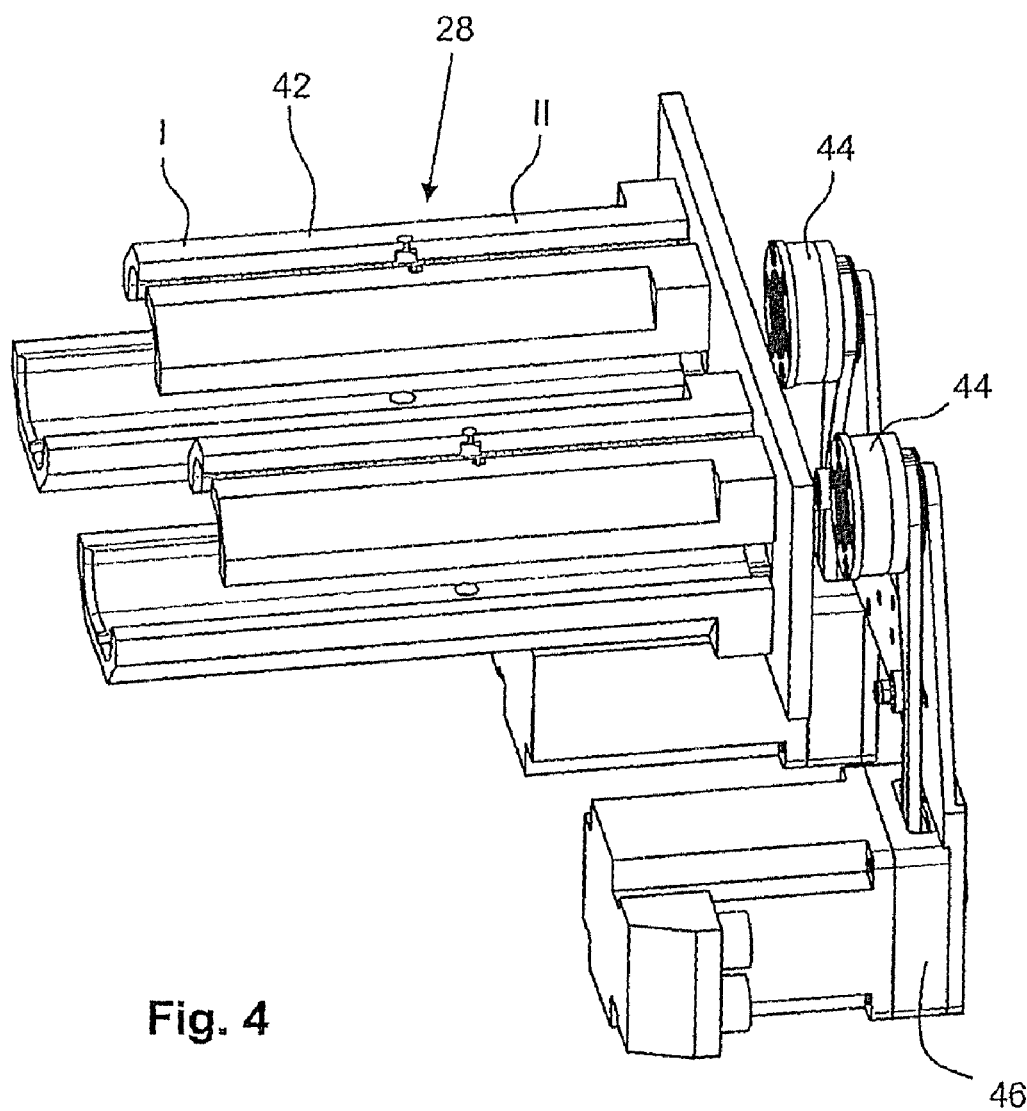
FIG. 4 is a schematic view in perspective from above of the package guide and the cap applicator.

The cap applicator 30 comprises a rotary chuck 44 for each of the two lines, i.e. it is disposed to be able to cap two packages 10 at a time, one from each line, see FIG. 4. The chucks 44 are disposed on a movable frame 46 which is disposed, in relation to the positioning of the packages in the package guide 28, to move the chucks 44 between a lower cap collection position to a capping position. From the capping position, which is a position in line with the neck of a package 10 in the package guide 28, the chuck 44 is thus displaced down to the cap collection position where a feeder device 48 feeds one cap 22 into the chuck 44. The chuck 44, see FIG. 5 and FIG. 6, is designed with a depression 50 disposed for receiving a cap 22. The depression 50 is of a size and shape which correspond to the size and shape of the cap so that the cap 22 may be pressed into the depression 50 and held in position there. In this example, the cap 22, and thereby the depression 50 are preferably circular. In order to facilitate retention and to ensure that the chuck 44 can rotate the cap 22 at the same speed of rotation, i.e. without any relative movement between chuck 44 and cap 22, the inner circumferential surface 52 of the chuck is provided with internal, axial grooves (not shown) which cooperate with external ridges 31 (see FIGS. 8 and 9) which extend axially along the cap 22.

The feeder device 48 is in communication with a supply channel for caps 22 and has a device which is intended to press a cap 22 into the chuck 44 when this arrives at the collection position. The cap 22 is pressed in with its top surface 33 facing in towards a bottom surface 54 in the chuck 44. The bottom surface 54 is provided with at least one air bleeder hole 56 through which any possible air which remains between the chuck 44 and the cap 22 can escape. By such means, the formation of any possible air cushion as a result of the rapid impression cycle of the cap is remedied.

As was mentioned previously, the machine also includes a first conveyor 32 which is designed to displace packages 10 between the mandrel wheel 24 and the magazine 26, a second conveyor 34 which is disposed to displace packages 10 between the magazine 26 and the package guide 28 as well as within the package guide 28 and via the cap applicator 30 to a third conveyor 36. The third conveyor 36 is disposed to take care of the ready-capped packages 10.

How the different units and the conveyors cooperate will be described hereinbelow, and with reference to FIG. 2.

The magazine 26 rotates the next package in turn, i.e. that package which has been in the magazine the longest time and which is ready to be collected into the package guide 28. Here, this package will now be designated the first package. A leading package, designated second package, is located at this stage in the second position II of the package guide. The conveyor 34 temporarily releases its grip on the second package and moves it to the left in the figure. It has the possibility of moving two packages in the same movement and thereby collects the following first package and once again grips the second package. The conveyor 34 then displaces both packages forwards a distance until the leading second package begins to approach the cap applicator 30. Then the movement merges into substantially constant movement speed up to the rotating chuck 44 and capping of the second package is initiated. At the end of the capping phase, the movement of both the second and the first package pauses until requisite tightening torque has been achieved with the chuck 44. It is then instead the cap 22 which moves out of the chuck 44 towards the package. After completed capping, it is time to deposit the second package in the third conveyor 36 and advance the following first package in a direction towards capping. The first conveyor 32 then collects a new, third, package in the mandrel wheel 24 and moves it into the magazine 26. At the same time, the second conveyor 34 takes and moves the leading first package into the first position I of the package guide and deposits the further leading second package in the third conveyor 36. The chuck 44 has then moved out of the way and is on its way to collect a new cap 22 in the feeder device 48 under the package guide 28. The magazine 26 rotates and the operations begin from the beginning.

The capping cycle, which will now be described with the aid of FIGS. 7, 8 and 9, comprises a first, introductory phase and a second phase. In the first phase, the package 10 is moved at the same time as the cap 22 is rotated, and in the second phase the package 10 is stationary while the cap 22 continues to rotate. In the first phase, the cap 22 is held in a stationary position, i.e. it is not displaced either in a longitudinal direction towards or away from the package guide 28.

The first, initial phase of the capping cycle will be described first. Reference is made to FIG. 7 which shows graphs of the torque of the chuck 44, the package movement and the speed of rotation of the chuck 4 and thereby the cap 22. The chuck 44, which has collected a cap 22, is moved up to the capping position flush with the neck 20 of that package 10 which is to be capped and begins the rotation. This is shown in position 1 in FIG. 7. The chuck 44 makes no movement in a direction towards the package guide 28 in the capping position. The second conveyor 34 now returns to the second position I of the package guide in order to collect a package 10 to advance to the cap applicator 30. In position 2 in FIG. 7, the rear position of the conveyor 34 is shown. The downward curve up to position 2 shows the rearward movement of the conveyor 34 and the upward curve after position 2 shows a forward movement thereof. Immediately after, the acceleration of the chuck 44 is complete, see position 3, and the norm speed of the chuck has been reached. This norm speed is a speed of rotation which the chuck 44 is to have during the introductory phase of the threading and this is substantially constant.

In position 4, the previously mentioned tamper evidence band 25 of the cap 22 begins entry over the sealing edge 29 of the package neck and the chuck torque increases temporarily. When it is ready, the conveyor 34 commences the linear movement of the package 10 towards the chuck 44. The term linear is taken to signify that the movement takes place at substantially constant speed. This movement can be seen from position 5 to position 7 in FIG. 7. The relationship between the rotation speed of the cap 22 and the movement speed with which the package 10 is moved with the aid of the conveyor 34 is, in this position, such that it has its counterpart in the thread pitch of the threads 23 in the cap 22 and the threads 21 on the package neck 20. This is taken to signify that the speeds are kept in relation to one another such that the internal threads 23 of the cap will substantially be able to follow the thread pitch of the external threads 21 of the neck. Naturally, the thread pitch of the neck 20 and the cap 22 are substantially the same and just as the threads 23 of the cap can follow the thread pitch of the threads 21 of the neck, the threads 21 of the neck can thereby follow the thread pitch of the threads 23 of the cap. This relationship can be written as the relationship $p=v_f/v_c$, where p is the thread pitch of the relevant threads, $v_f$ is the speed of displacement of the package towards the cap and $v_c$ is the speed of rotation of the chuck and thereby also of the cap. In a thread pitch p of, for example, 10 mm/turn and a displacement speed $v_f$ of the package of 100 mm/s, the speed $v_c$ of the chuck must be 10 revolutions/sec=$10 \text{ s}^{-1}$.

This prevents the threads 21 on the fragile neck 20 from being damaged through deformation. The threads 23 in the cap 22 are not as sensitive, since the cap 22 is supplied to the machine. It has not been manufactured in the machine and, as a result, is considerably more configurationally stable. The matching with the thread pitch is further illustrated in FIGS. 8 and 9 below.

Before the important function of the matching is illustrated, the tamper evidence band 25 snaps however in over the sealing edge 29, which is illustrated by the drastic reduction of the torque over the chuck 44 in position 6. Thereafter, it is time for the thread 23 in the cap 22 to find the lead entry in the thread 21 on the neck 20. There are three lead entrances in the thread 21, and the thread 21 thereby consists of three sections, of which one such section is marked with a G in FIG. 8. A corresponding section is found in the cap. For the sake of simplicity, only the interplay between H and G will be described. The most desirable situation is if a corresponding section H in the cap comes into contact with the thread of the neck at that point which is marked with a E in FIG. 8. However, it is not at all certain that such will be the case. Instead, the thread section H may come into contact somewhere else along the section G, perhaps even at point F which is shown in FIG. 8. The thread section 8 is then to slide along the entire thread section G before the cap 22 gains a real grip on the neck 20. Since the thread on the neck 20 is soft, it will thus be vitally important that the thread section H is not given the chance to press against the thread section G. This risk is eliminated by ensuring that the, in this position, substantially constant package movement and, in the same position, the substantially constant speed of rotation of the cap 22 are matched so that the thread pitch is followed. The thread section H can then slide around and down along the section G without appreciable stresses on the latter. In FIG. 8, rotation takes place of the cap 22 clockwise around an axis Z in the plane of the paper.

In position 7, the threads have reliably entered into mesh correctly with one another. The first introductory phase is completed. In the second following phase, the package movement stops and rotation of the chuck 44 enables the cap 22 to continue to be threaded on the neck 20. However, the chuck 44 is stationary, i.e. it moves neither towards or away from the package 10. Since, as a result, there is no relative speed in the longitudinal direction between the package 10 and the chuck 44, the cap 22 will be drawn a distance out of the chuck 44 during the final threading cycle. The cap 22 slides readily out of the chuck 44.

At position 8 in FIG. 7, the torque increases in order slightly thereafter to fall dramatically again. This takes place when the tamper evidence band 25 snaps over the edge 27 of the neck 20. From there and up to positions 10 and 11, the torque of the chuck then increases.

Tightening of the cap 22 on the neck 20 takes place until a selected tightening torque has been reached. At position 10, the chuck speed is reduced and from there to position 11, it can be seen that the torque is at a high level.

The capping cycle is rapid. The time taken from the first engagement being made between the threads and until the desired tightening torque is reached is of the order of magnitude of 100 ms.

In the chuck 44, or in contact with the chuck 44, there are conventional means for detecting the tightening torque. This sensing takes place at short time intervals, preferably once every 16-20 ms. The torque level tends to vary up and down in strength between positions 10 and 11 and, as a result, the requisite tightening torque is designated as an interval between a minimum and a maximum level. When two readoffs have been able to detect the requisite tightening torque, i.e. a torque within the minimum and maximum range, the cap 22 is tightened and the torque released, i.e. the prime mover driving the chuck 44 is closed off. This can be seen at position 12.

Finally, the chuck 44 is displaced in the axial direction away from the package 10 and then down to the feeder device 48 to collect a new cap 22.

In the described embodiment, the feeder device 48 is, as was previously mentioned, preferably placed under the cap application. This entails that the package 10, when it is capped, can be moved horizontally over and past the chuck 44 and into the previously mentioned third conveyor 36 which raises up the package 10 and moves it further to a filling station, possibly first past a sterilization station. It is the previously mentioned second conveyor 34 which caters for the movement of the ready-capped package 10 to the third conveyor 36.

Said third conveyor 36 raises up the package 10 as was mentioned above so that the still open end, the bottom, of the package 10 points in an upward direction in the machine. The package 10 is displaced to the filling station and positioned beneath the filler nozzle. After the filling, which takes place in a per se known manner, the package 10 is moved to a sealing station for transverse sealing of the sleeve end. Numerous methods of transverse sealing of a laminate sleeve of tube are previously known in the art and will not be described in greater detail here. After the transverse sealing, the filled and sealed package is moved to a final folding station where the bottom of the package is formed.

The present invention has been described with the aid of a currently preferred embodiment. However, it should be understood that the present invention is not restricted to this embodiment, but that a number of variations and modifications are possible without departing from the scope of the appended Claims.

In the example, it has been described that the speed of displacement $v_f$ of the package 10 is substantially constant and that the speed of rotation $v_c$ of the cap is substantially constant. However, it should be observed that it is obvious that both of these speeds need not be constant as long as it can be ensured that the relationship between them has its counterpart in the thread pitch p.

The terms "tube form" and "sleeve" have here been interpreted broadly, i.e. all types of package cross sections are encompassed. As a result, the package may, for example, be of circular, triangular, square, rectangular or polygonal cross section. In the example described here, the cross section is square.

The invention claimed is:

1. A method, in a filling machine, of producing a package with an opening arrangement, the method comprising:
   producing a sleeve from a packaging laminate comprising at least a core layer of paper;
   injection moulding a top of plastic material on an end portion of said sleeve so that there is formed a liquid-tight connection between said sleeve and said top;
   in the injection moulding, providing the top with a part of said opening arrangement, which includes a neck with external threads, the neck defining a pouring opening;
   capping the neck while the top including the external threads is still at a temperature of 40° C. to 80° C. so that the capping of the neck is performed before the top including the external threads has reached a configurationally stable state, the capping, at least during a first initial phase, taking place in that a cap with corresponding internal threads is rotated and the package is displaced in a direction towards the cap in such a manner that it may be ensured that a relationship between the speed of rotation of the cap and the speed of displacement of the package substantially correspond to thread pitch of the threads in the cap and on the neck in that position when the threads come into contact with one another; and
   during the first initial phase of the capping while the cap is being rotated, the cap is held stationary in a direction towards and away from the package.

2. The method as claimed in claim 1, wherein the method includes maintaining a substantially constant speed of displacement of the package and a substantially constant speed of rotation of the cap.

3. The method as claimed in claim 2, wherein the method includes, at least in a first introductory phase, holding the cap in a stationary position and rotating the cap by positioning it in a rotary chuck.

4. The method as claimed in claim 2, wherein the method includes, in a subsequent second phase of the capping, stopping displacement of the package.

5. The method as claimed in claim 1, wherein the method includes, at least in a first introductory phase, holding the cap in a stationary position, and rotating the cap by positioning it in a rotary chuck.

6. The method as claimed in claim 3, wherein the method includes, in a subsequent second phase of the capping, stopping displacement of the package.

7. The method as claimed in claim 1, wherein the method includes, in a subsequent second phase of the capping, stopping displacement of the package.

8. The method as claimed in claim 1, wherein the method comprises capping the package when the top is still at a temperature in the range of between 65 and 80° C.

9. A method of producing a package with an opening arrangement, the method comprising:
   injection moulding a top of plastic material on an end portion of a sleeve to form a liquid-tight connection between the sleeve and the top, the sleeve being made of a packaging laminate comprising at least a core layer of paper, and the top produced by the injection moulding comprising a neck with external threads which possess a thread pitch, the neck defining a pouring opening, the neck possessing an end opposite the sleeve that is open and communicates with the pouring opening;
   applying a cap to the neck possessing the open end before the top has reached a configurationally stable state, the cap possessing internal threads, the applying of the cap to the neck comprising rotating the cap and displacing the package towards the cap, the rotating of the cap occurring while the cap is stationarily positioned in a direction toward and away from the package; and
   at least during a first initial phase of the cap being applied to the neck, a relationship between a speed of rotation of the cap and a speed of displacement of the package toward the cap substantially corresponding to the thread pitch to prevent the external threads on the neck from being damaged through deformation while the cap is being applied to the neck.

10. The method as claimed in claim 9, wherein the method includes capping the package when the top including the external threads is still at a temperature in a range between 40 and 80° C.

11. The method according to claim 9, wherein the cap is applied while the package is positioned in a package guide, the injection moulding of the top on the end portion of the sleeve occurring while the sleeve is positioned on a rotatable mandrel, the method further comprising: rotating the mandrel after the injection moulding to position the sleeve adjacent a magazine; transferring the sleeve from the mandrel to the magazine; cooling the top while the sleeve is in the magazine; and transferring the sleeve from the magazine to a packaging guide, the applying of the cap to the neck occurring while the sleeve is in the packaging guide.

12. The method as claimed in claim 11, wherein the method includes the step of capping the package when the top including the external threads is still at a temperature in the range of between 40 and 80° C.

13. The method as claimed in claim 9, further comprising: during a second phase of the cap being applied to the neck, stopping displacement of the package towards the cap so that the package is stationarily positioned in a direction toward the cap while continuing to rotate the cap; the second phase following the first phase.

14. A method of producing a package with an opening arrangement, the method comprising:
injection moulding a top of plastic material on an end portion of a sleeve to form a liquid-tight connection between the sleeve and the top, the sleeve being made of a packaging laminate comprising at least a core layer of paper, and the top produced by the injection moulding comprising a neck with external threads, the external threads possessing a thread pitch and the neck defining a pouring opening;
applying a cap to the neck while the top is still at a temperature between 40° C. and 80° C. so that the cap is applied to the neck before the top including the external threads has reached a configurationally stable state, the cap possessing internal threads, the applying of the cap to the neck comprising rotating the cap and displacing the package towards the cap; and
at least during a first initial phase of the cap being applied to the neck, a relationship between a speed of rotation of the cap and a speed of displacement of the package toward the cap substantially corresponding to the thread pitch.

15. The method according to claim 14, wherein the neck extends away from the sleeve and terminates in a free end, the applying of the cap to the neck occurring when the free end of the neck is open and in communication with the pouring opening.

16. The method according to claim 14, wherein the cap is applied while the package is positioned in a package guide, the injection moulding of the top on the end portion of the sleeve occurring while the sleeve is positioned on a rotatable mandrel, the method further comprising: rotating the mandrel after the injection moulding to position the sleeve adjacent a magazine; transferring the sleeve from the mandrel to the magazine; cooling the top while the sleeve is in the magazine; and transferring the sleeve from the magazine to a packaging guide, the applying of the cap to the neck occurring while the sleeve is in the packaging guide.

17. The method as claimed in claim 14, further comprising: during a second phase of the cap being applied to the neck, stopping displacement of the package towards the cap so that the package is stationarily positioned in a direction toward the cap while continuing to rotate the cap; the second phase following the first phase.

* * * * *